United States Patent
Lorenz

(10) Patent No.: US 7,589,721 B2
(45) Date of Patent: *Sep. 15, 2009

(54) METHOD FOR INTERACTIVE SEGMENTATION OF A STRUCTURE CONTAINED IN AN OBJECT

(75) Inventor: Cristian Lorenz, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 29 days.

This patent is subject to a terminal disclaimer.

(21) Appl. No.: 11/553,049

(22) Filed: Oct. 26, 2006

(65) Prior Publication Data
US 2007/0052707 A1   Mar. 8, 2007

Related U.S. Application Data

(63) Continuation of application No. 10/508,562, filed on Sep. 22, 2004, now Pat. No. 7,142,208.

(30) Foreign Application Priority Data
Mar. 23, 2002   (DE) ................................ 102 13 151

(51) Int. Cl.
*G06T 17/00* (2006.01)
*G06T 5/30* (2006.01)

(52) U.S. Cl. .......................... 345/424; 382/154; 382/257
(58) Field of Classification Search ................. 382/131, 382/154, 256–569
See application file for complete search history.

(56) References Cited

U.S. PATENT DOCUMENTS

| | | | |
|---|---|---|---|
| 7,142,208 B2 * | 11/2006 | Lorenz | 345/424 |
| 2002/0090121 A1 * | 7/2002 | Schneider et al. | 382/128 |
| 2003/0142857 A1 * | 7/2003 | Alyassin | 382/131 |
| 2003/0152262 A1 * | 8/2003 | Mao et al. | 382/154 |

* cited by examiner

*Primary Examiner*—Kee M Tung
*Assistant Examiner*—Andrew Yang

(57) ABSTRACT

The invention relates to a method for the interactive segmentation of a structure contained in an object from a three-dimensional image of the object. In an expansion mode a region expansion process is carried out, the results of said process simply being completely or partly undone again in a contraction mode. A quasi-continuous similarity measure can be used to determine whether or not a voxel belongs to the structure to be segmented. The expansion taking place in the region expansion process always involves the voxels having the largest similarity measure each time.

20 Claims, 5 Drawing Sheets

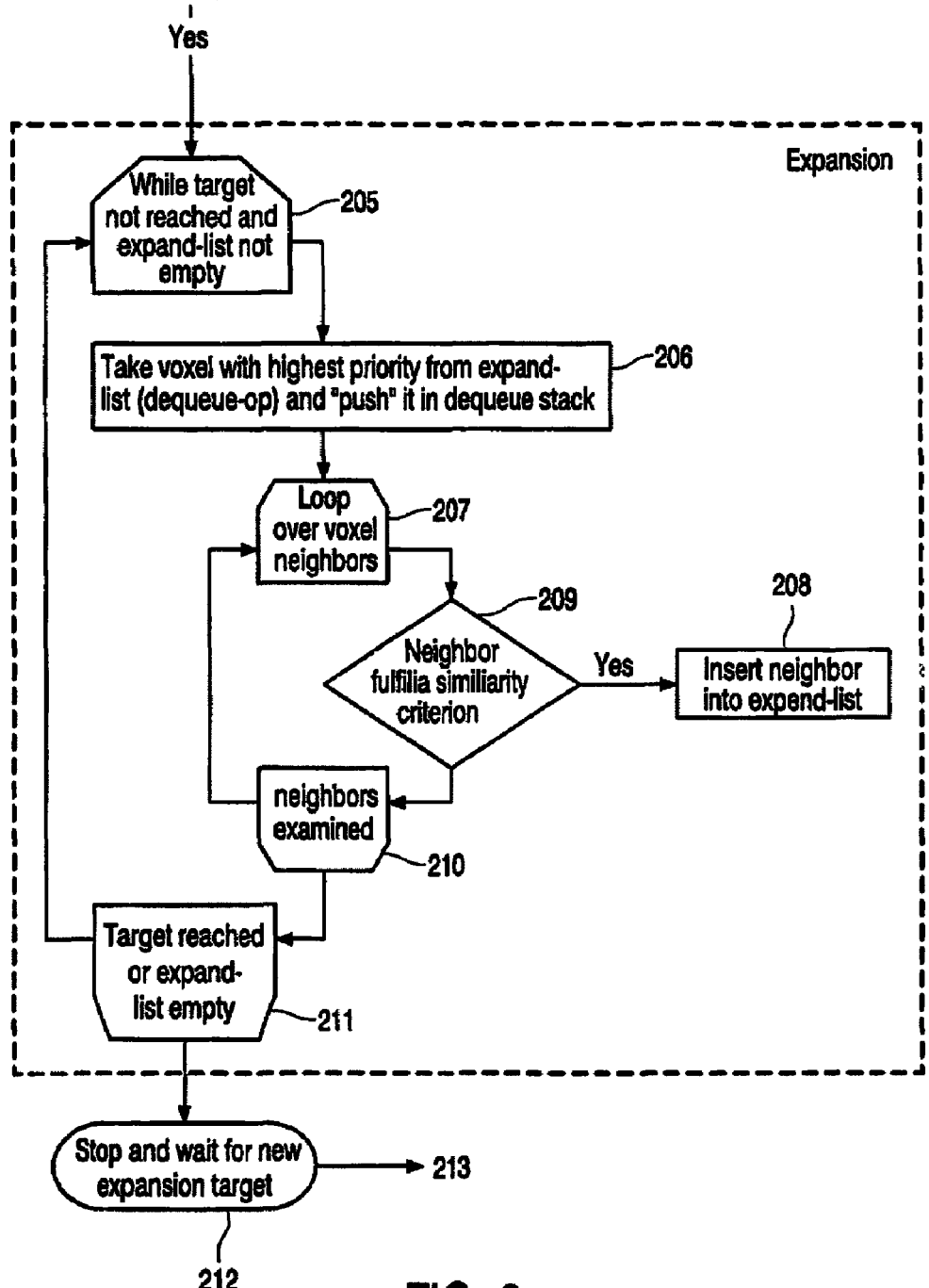

METHOD FOR INTERACTIVE SEGMENTATION OF A STRUCTURE CONTAINED IN AN OBJECT

Figure 1:
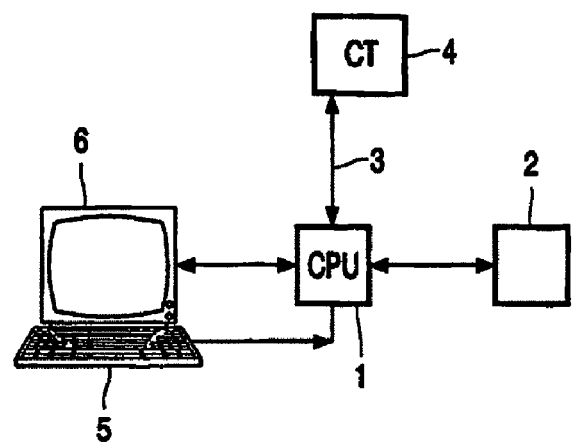

This is a Continuation of application Ser. No. 10/508,562, filed Sep. 22, 2004.

The invention relates to a method for the interactive segmentation of a structure contained in an object from a three-dimensional image of the object. The invention also relates to an image processing device for carrying out the method, to a computer program for such an image processing unit, and to an imaging device including such an image processing unit.

Known methods for the segmentation of a structure contained in an object are based on a so-called region growing or region expansion process in which the user defines one or more so-called seed voxels in the structure to be segmented. Subsequently, the voxels neighboring the seed voxels are examined as to whether or not they belong to the structure. The voxels belonging to the structure form the first generation of voxels whose neighboring voxels are subsequently examined as to whether or not they belong to the structure. If they belong to the structure, they form the second generation of voxels whose neighboring voxels again are examined as to whether or not they belong to the structure, and so on. The voxels are thus examined one generation after the other until the process is stopped automatically if no further voxels belonging to the structure are found.

The quality of the segmentation achieved in this manner is dependent to a decisive degree on the quality of the similarity criterion which governs the decision as to whether or not a voxel belongs to the structure to be segmented. It may occur that voxels are assigned to the structure even though they do not belong to the structure, or that voxels which belong to the structure are not assigned to the structure, or both. It may be necessary for the user to repeat the segmentation method while using a modified similarity criterion.

EP 0516047 discloses a method of the kind set forth in which the user is interactively engaged in the segmentation process. Therein, the instantaneous segmentation status is continuously reproduced in a segmentation image while utilizing the voxels which have been recognized by the method as belonging to the structure. When the user detects that the segmentation image also shows a region which, on the basis of the user's knowledge of the anatomy, cannot belong to the structure searched, the user defines a seed voxel in this region.

As from this seed voxel, a new expansion process is started whose result is superposed on the segmentation image, for example, in a different color. This expansion process first determines voxels from the region which does not belong to the structure. When this second expansion reaches the structure to be segmented, the user can interrupt this second expansion and erase the region (not belonging to the structure) thus determined, so that only the structure searched remains as the segmentation result.

For this interactive segmentation to be successful it is a prerequisite that there is only one region (or only very few regions) in which the (first) expansion can take place and that these regions are connected to the structure only via one (or very few) as narrow as possible connecting links. When the structure is enclosed by a large region having characteristics similar to those of the structure, it is practically impossible for the user to separate this region from the structure within reasonable limits of cost and effort.

It is an object of the present invention to provide an improved method for the interactive segmentation of a structure.

In accordance with the invention this object is achieved by means of a method for the interactive segmentation of an object contained in an object from a three-dimensional image of the object, which method involves a continuous visualization of the instantaneous segmentation status in a segmentation image and includes an expansion mode and a contraction mode, the following steps being carried out in the expansion mode:

a). determining the similarity between the neighboring voxel of a defined voxel and the structure, b). storing the order in which the similarity of the voxels belonging to the structure is determined, c). repeating the steps a) and b) for all voxels of the structure which have not yet been processed or have been newly determined, while in the contraction mode the voxels are removed, on the basis of the instantaneous segmentation status, from the segmented structure in an order which is the reverse of that in which they have been determined as belonging to the structure in the expansion mode.

The invention offers the user a choice between the expansion mode and the contraction mode after the start of the segmentation. When the segmentation has not yet progressed far enough, the user will choose the expansion mode and hence continue the region growing process. However, if the segmentation has progressed too far, so that the segmentation has already reached regions which no longer belong to the structure, the user will choose the contraction mode in which the segmentation is undone one voxel after the other, so that the previous stages of the segmentation can be reached again.

The best segmentation possible for the defined assignment of voxels to the structure can thus be achieved in a simple manner. If this assignment is binary (for example, 1=the voxel belongs to the structure, 0=the voxel does not belong to the structure), the quality of the segmentation will be dependent on the degree of correctness of this assignment.

This dependency is eliminated in the version disclosed in claim 2. For the evaluation of the neighboring voxels a quasi-continuous similarity measure is then determined instead of a binary similarity criterion; this quasi-continuous similarity measure describes the extent to which the voxel being examined has a property which is characteristic of the structure. For example, if a bone structure in a CT image is characterized in that it exhibits the highest Hounsfield values, it is not necessary to determine whether the Hounsfield value of a voxel is large enough so as to belong to the structure or not. It suffices instead to use the Hounsfield value (which may be between −1000 and +1000) as the similarity measure.

In this respect it is essential that the selection of the voxels whose neighbors are to be examined does not take place in generations, but on the basis of the value of the relevant similarity measure. Therefore, this method initially expands only in the regions whose characteristics are most similar to those of the structure. In the course of the further process, those regions are added in which the characteristics of the structure are less pronounced. Should the user not interrupt the expansion process at all, the result could be the segmentation of an image which corresponds to the three-dimensional image to be segmented. However, if the user stops the expansion in time, a very good segmentation image will be obtained.

The version disclosed in claim 3 makes it possible for the user to define in advance how far the expansion (or the reversal of the expansion) should proceed before it is automatically stopped. The number of selection steps can then indicate how many steps should be carried out during the expansion starting at the seed voxel, but also a number of steps which is based on the instantaneous segmentation status. When this choice is made after an interruption of the segmentation by the user, the user's choice determines whether subsequently the expansion mode or the contraction mode takes place.

A very large number of voxels can be stored in the list in the course of the segmentation method. The selection of the voxel having the highest similarity measure from the list would then require a comparatively long period of time, even if the similarity measure were stored therein in addition to the position of the voxel. This search is significantly simplified by the version disclosed in claim 4, because the search can commence with the sub-list with which the highest value of the similarity measure is associated and finish as soon as a voxel not previously selected is encountered in this sub-list and the next-higher sub-lists. The search becomes even simpler when each time the sub-list in which such a voxel is present is marked during the segmentation process.

In conformity with the version disclosed in claim 5, neighboring voxels having a low similarity measure are not even stored in the list, so that the list becomes less extensive. If the minimum value was chosen to be too small, as opposed to the known methods such a choice would not have a negative effect on the quality of the segmentation result. When the selected voxel is situated at the edge of a structure, in conformity with this version it may occur that none of its neighboring voxels is taken up in the list (apart from the voxel as from which the relevant voxel was determined during a preceding expansion step).

The version of the invention disclosed in claim 6 is particularly suitable for the segmentation of bone structures in a CT image. In the simplest case the similarity measure of a voxel then corresponds to its grey value (that is, the Hounsfield value).

Claim 7 describes an image processing device for carrying out the method in accordance with the invention while claim 8 discloses a computer readable medium containing a program for such an image processing device and claim 9 discloses a diagnostic medical imaging device, notably a computed tomography apparatus including such an image processing device.

Figure 2:
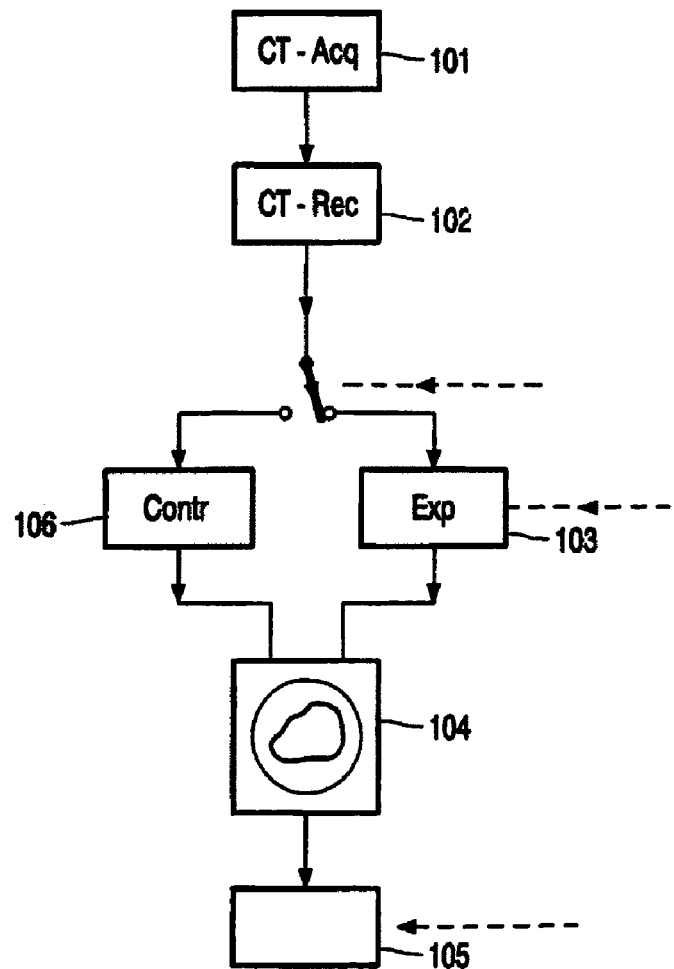
Figure 3A:
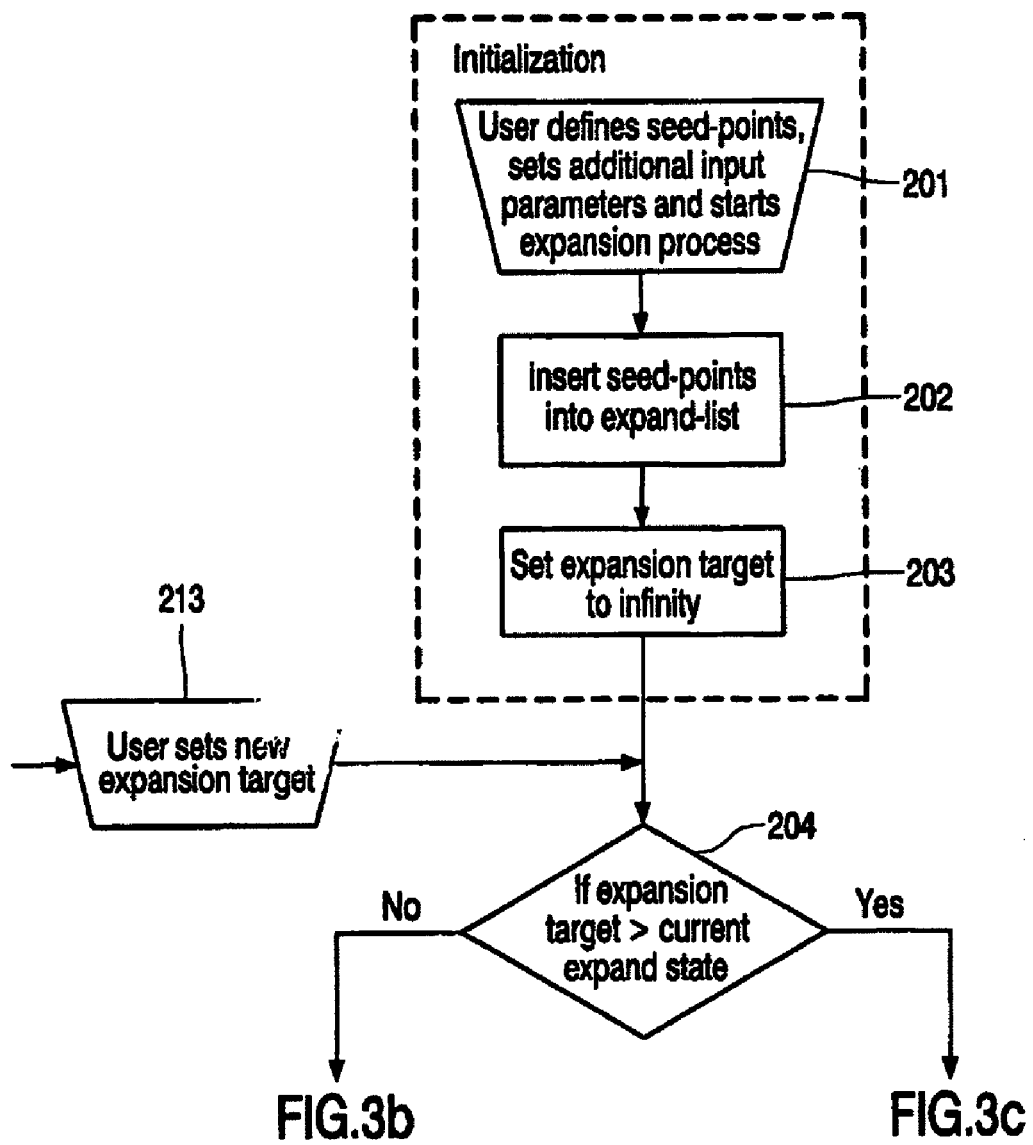
Figure 3B:
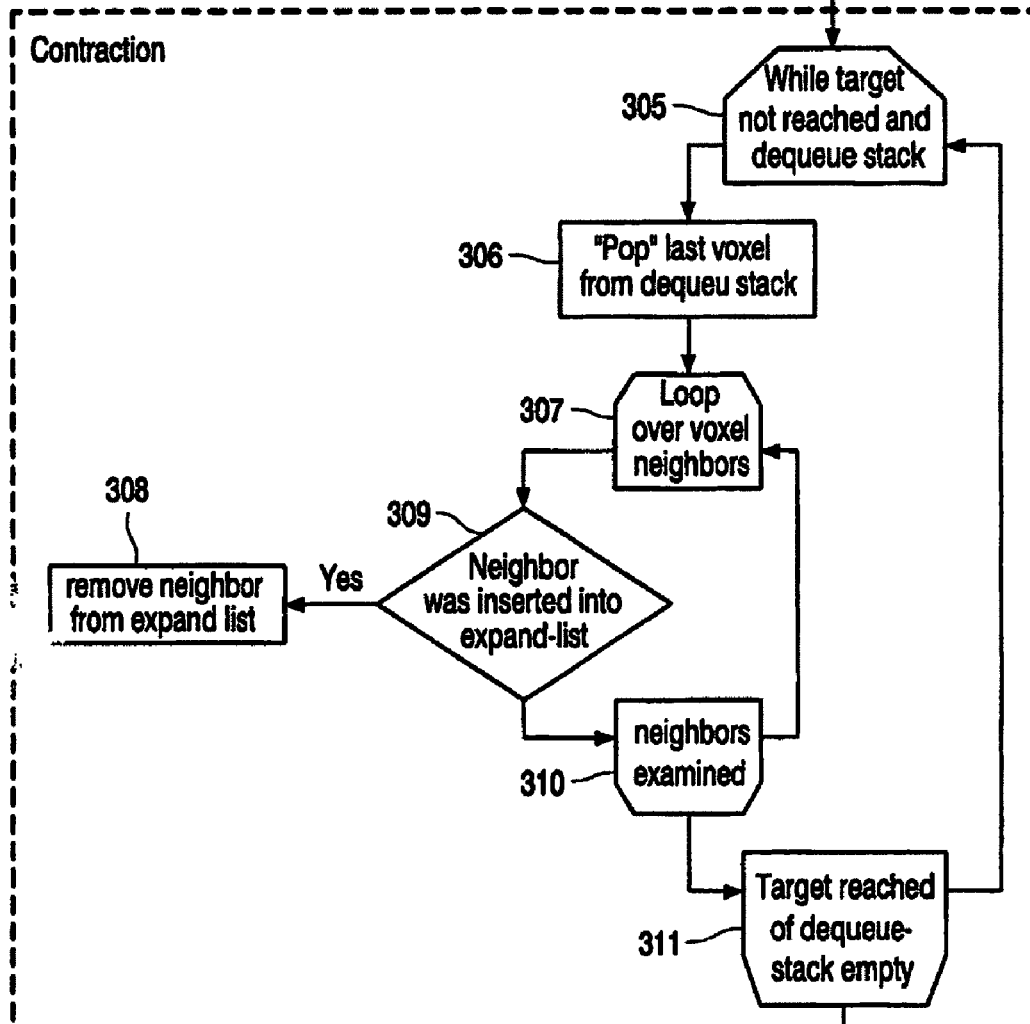
Figure 4:
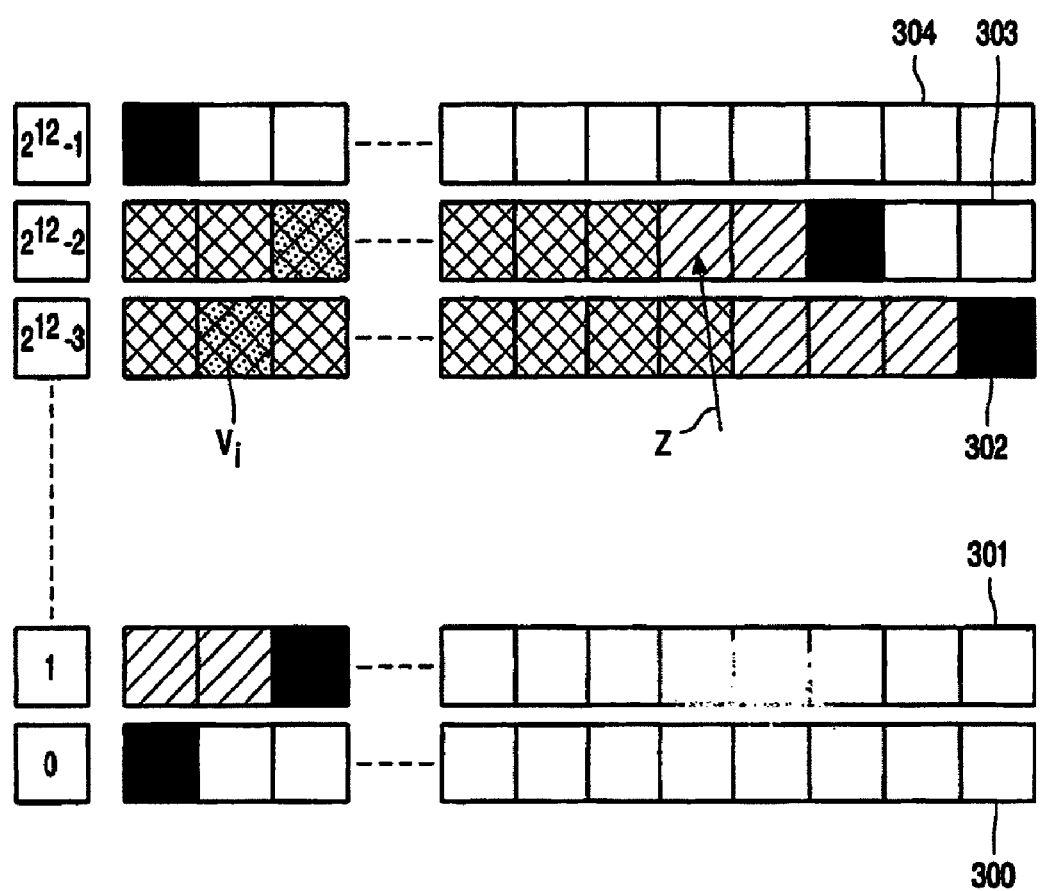

The invention will be described in detail hereinafter with reference to the drawings. Therein:

FIG. 1 shows an image processing unit for carrying out the method in accordance with the invention, FIG. 2 shows a flow chart of an imaging method up to the segmentation, FIG. 3a shows a first part of a detailed flow chart, FIG. 3b shows a second part of such a detailed flow chart, FIG. 3c shows a third part of such a detailed flow chart, and FIG. 4 shows the structure of a list used in this context.

The image processing device shown in FIG. 1 includes an image processing and control processor 1 which is provided with a memory 2 which is capable of storing a three-dimensional image of an object to be examined and also some lists required for the execution of the method. The image processing and control processor 1 is connected, via a bus system 3, to an imaging device 4 which is shown purely diagrammatically, for example, a computed tomography apparatus or an MR apparatus. The results obtained by means of the invention can be displayed on a monitor 6. The user can access the image processing and control processor 1 via a keyboard or other input units which are not so shown in the drawing, thus exerting an effect on the execution of the segmentation process.

FIG. 2 is a diagrammatic representation of a procedure which commences with the data acquisition for a three-dimensional image of an object and ends with the segmentation of a structure within this object. Using a computed tomography apparatus, CT data of an object is acquired in step 101. In step 102 an image of the object is reconstructed from this CT data. Subsequently, in step 103 the user can start the expansion mode in order to segment a structure on the basis of the region growing process in accordance with the invention. The relevant segmentation status is continuously displayed for the user, for example, a physician, in a segmentation image (step 104) which is continuously updated, so that the user can watch the growth of the segmented structure.

The user has many possibilities for intervention. The user can interrupt the segmentation process or terminate it (in step 105). After the interruption, the user can continue the expansion mode. However, the user can also reverse the segmentation process if the segmentation has proceeded too far, said reversal being initiated by activating the contraction mode. In block 106 the expansion steps are then undone again in the reverse order, so that the segmentation is set back to an earlier phase of the expansion again.

FIGS. 3a, 3b and 3c show details of the segmentation method. After the initialization, the user defines at least one seed voxel in the three-dimensional CT image, that is, a voxel situated at the center of the structure to be segmented (step 201). The user may also define a plurality of seed voxels; this is necessary, for example, when two structures which are separated from one another in space (for example, the two shoulder blades) are to be segmented in the CT image. It is also possible to define different types of seed voxels so as to enable discrimination of different structures of similar consistency, for example, the shoulder blades from the vertebral column. Moreover, the user can set further input parameters in the step 201.

Subsequently, in step 202 the seed voxels and their similarity measure are stored in a first list which will be referred to as the expansion list hereinafter. The similarity measure of a voxel defines the degree to which the voxel exhibits a property which is characteristic of the relevant structure, that is, quasi the probability that a voxel belongs to the structure. In the simplest case the similarity measure may be defined by the grey value of the relevant voxel in the three-dimensional image, that is, by the Hounsfield value in the case of a CT image. This simple similarity measure is suitable for the segmentation of bone structures in a CT image, because they have the highest Hounsfield values. When other structures are to be segmented, other similarity measures must be used.

The number of expansion steps is defined in step 203. In this respect it is effective to specify a very large number (for example, an infinite number), so that the segmentation process could be continued until it is finished, that is, if it is not terminated by the user before that. The setting can be performed graphically, for example, by means of a slider which is displayed on the monitor 6 and can be shifted by the user. The instantaneous number of steps can be indicated by means of a bar which is situated underneath the slider and whose length can vary in conformity with the number of expansion steps; the target has been met when the bar reaches the slider.

In the step 204 it is checked whether the defined number of expansion steps is larger than the number of expansion steps carried out thus far. If this is not the case, a contraction mode (FIG. 3b) is activated, and otherwise the expansion mode (FIG. 3c). After the start, in the step 204 first the expansion mode is activated. This mode comprises a loop which is defined by blocks 205 and 211 and is completed a number of times until the defined number of steps is reached or the expansion list is empty or the user stops the expansion before that. In step 206 the voxel having the highest similarity measure is selected from the expansion list. When the loop is completed the first time, this voxel is always one of the seed voxels. When the loop is completed for the second time, however, a voxel which does not belong to the seed voxels may also be selected, that is, if this voxel has a similarity measure which is higher than that of the remaining seed voxels.

The individual voxels and their similarity measure could in principle be stored in the expansion list. Considering the large number of voxels which could occur in the course of the expansion process, too much storage space would then be required and a large amount of calculation time would be necessary so as to find each time the voxel having the highest similarity measure.

FIG. 4 is a diagrammatic representation of a form of the expansion list which requires less storage space and enables faster processing. The expansion list is now subdivided into as many sub-lists 300, 301 . . . 302, 303 and 304 as there may be Hounsfield values present in the CT image, so that each sub-list is associated with one of the Hounsfield values; these values are stated in the column of boxes shown at the left in FIG. 4. The boxes, constituting each sub-list, symbolize the elements of the sub-list which can take up one voxel each. A white (empty) element means that no voxel is stored therein as yet. In each sub-list there is marked in black the element which takes up each time the next voxel belonging to this sub-list (or to this similarity measure). To the left thereof there are indicated, by way of hatching, the elements which contain voxels which have not been selected thus far. Voxels which have already been selected during the expansion process are denoted by cross-hatching to the left thereof. Some of these voxels are visible in the segmentation image (these voxels are provided with dots in addition to the hatching) and others are not.

Each element of the sub-lists can store, for example, 32 bits: 29 bits for the position of the voxel, 2 bits which characterize the type of seed voxel wherefrom the relevant voxel was derived during the expansion, and 1 bit which indicates whether the relevant voxel is visible in the instantaneous segmentation image or not. Moreover, for each sub-list there is provided a pointer Z which indicates the element which is selected as the next one in its sub-list. Finally, all sub-lists which contain a voxel not selected thus far will have been marked (not shown).

In the step 206, after the selection of the voxel (in the case of the expansion list shown in FIG. 4 this would be the voxel from the sub-list 303 pointed out by the pointer Z), the pointer in the sub-list is shifted one position to the right, and the counter for the number of expansion steps is incremented by 1. Moreover, the similarity measure of this voxel is taken up in a second list which will be referred to as the contraction list hereinafter.

Subsequently, there is formed a further loop which is defined by blocks 207 and 210 and is completed six times, that is, once for each voxel which neighbors the selected voxel by way of one side. In step 209 it is tested whether or not the relevant voxel satisfies a similarity criterion possibly set in the step 201. In the present example this would mean that it is checked whether the Hounsfield value of the voxel reaches a minimum value or not. However, it is not necessary for the user to set such a similarity criterion. If no criterion is defined, all voxels not yet taken up in the expansion list are then taken up in the sub-list associated with their respective similarity measure. The neighboring voxels then "inherit" the characterization of the seed voxel from the expansion of which they have emanated.

When the user has set seed voxels on the shoulder blades, the collar bones and the vertebral column in the step 202, in the expansion mode the shoulder blades and the collar bones will become visible first in the continuously updated segmentation image, because the seed voxels situated therein, and their neighboring voxels, have a Hounsfield value which is higher than that of the seed voxel set on the vertebral column. The vertebral column will start to "grow" only after the growing of the other two regions has terminated. The vertebra on which a seed voxel has been set then starts to grow first. It is only after this vertebra has been completed in the segmentation image that the expansion can proceed to the neighboring vertebra via the disc situated therebetween. The ribs become successively visible in the segmentation image only after the entire vertebral column has become visible, said ribs being connected to the vertebral column via a cartilaginous mass whose Hounsfield values are lower than those of the ribs or the vertebrae.

Therefore, it is important that the user (provided that the user sets a similarity criterion in the form of a minimum value of the similarity measure which is tested in the step 209) sets this minimum value to be so small that not only the bone structures are presented to the user, but also the cartilaginous structures situated therebetween. As soon as the expansion reaches a rib, the expansion of the path through the cartilaginous mass stops and the expansion in the bony rib commences. As a result, the intermediate spaces between rib and vertebral column remain to a high degree recognizable as such in the segmentation image.

The expansion mode stops in step 212 when the defined number of steps is reached or when the expansion list contains only voxels which have already been selected in the step 206 and subsequently processed, or when the user intervenes interactively. The user can then change the parameters of the visualization. For example, the user can change the viewing direction (in the case of a rendering of the surface), so that the user obtains a different view of the structure and voxels which were not visible thus far become visible and vice versa. If in the simplest case the segmentation image is formed by a slice image, the user can also change the position of the slice shown.

When the user considers the segmentation status reached to be adequate, the user can terminate the process. If the expansion process executed thus far has not proceeded far enough or has gone too far, the user can change the number of expansion steps in step 213 (FIG. 3*a*). If the expansion has not gone far enough, the user will set a larger number of expansion steps in the step 213 and/or lower the similarity criterion tested in the step 209, after which the expansion process with the steps 205 to 211 is carried out again.

When the expansion has gone too far in the opinion of the user, the user will set a smaller number of expansion steps in the step 213. Subsequently, a contraction mode is activated which reverses the segmentation, the expansion steps last executed then being undone first. The execution of the contraction process is thus analogous to that of the expansion process, be it in the reverse direction. It includes a first loop with the elements 305 and 311, which loop is completed again and again until a segmentation status is obtained which corresponds to the newly set (smaller) number of expansion steps or until the contraction list is empty (in this case the segmentation status prior to the beginning of the expansion method would have been reached again). Additionally, the user can interrupt the execution of the loop when he considers the segmentation status to be adequate.

In step 306 the step counter is decremented each time by 1, and the last voxel taken up in the contraction list is removed therefrom again. The composition of the contraction list could be analogous to that of the expansion list. However, it is simpler to store merely the similarity measure of the selected voxel in the contraction list in the step 206. In the contraction mode the associated voxel is then obtained from the sub-list associated with this similarity measure, for example, 303, and the position of the pointer in this sub-list. In the step 306 the similarity measure last stored in the contraction list is thus erased and the pointer Z in the sub-list provided for this similarity measure is shifted one position further to the left.

In the loop defined by the elements 307 and 310 the neighboring voxels are subsequently tested. When it is determined in the step 309 that the relevant neighboring voxel was taken up in the expansion list, it is removed therefrom again in the step 308. In this contraction process the expansion is thus undone one step after the other. The contraction process ends when the loop 305 . . . 311 has been completed an adequate number of times or when the user stops the contraction. The process then proceeds to the step 212. The user then again has the possibility of terminating the segmentation process, of continuing the contraction process or of (partly) undoing the results of the preceding contraction process again.

The invention can in principle be used for the segmentation of other structures having a different similarity measure. For example, for the segmentation of soft tissues it may be necessary to segment regions which are as homogeneous as possible. In that case the similarity measure is an as small as possible difference between the grey value of the voxel being examined and the gray value of the seed voxel.

In another method for the segmentation of carcinogous tissue, regions of the same texture (the type of the gray value structuring) are recognized as belonging to the structure. Accordingly, a suitable similarity measure in this respect would take into account the similarity of the gray value distribution in a vicinity of the voxel being examined.

The invention claimed is:

1. A method for interactive segmentation of a structure contained in an object from a three-dimensional image of the object, the method comprising:
    continuously visualizing, on a display, an instantaneous segmentation status in a segmentation image; and
    performing, with a processor, one of an expansion mode and a contraction mode, wherein performing the contraction mode comprises removing voxels based on the instantaneous segmentation status and performing the expansion mode comprises:
    a) determining similarities between neighboring voxels of a defined voxel and the structure,
    b) storing an order in which the similarities of the voxels belonging to the structure are determined, and
    c) repeating steps a) and b) for voxels of the structure which have not yet been processed or have been newly determined.

2. The method as claimed in claim 1, in which the expansion mode further comprises:
    d) determining a similarity measure, describing the similarity between each neighboring voxel and the structure,
    e) storing the neighboring voxels in a list,
    f) selecting a voxel having the largest similarity measure from the list,
    g) determining the similarity measure for neighboring voxels of the selected voxel,
    h) storing the neighboring voxels in the list, and
    i) repeating steps f) to h) for voxels which have not yet been selected.

3. The method as claimed in claim 2, in which the number of selection steps can be interactively set and the segmentation, or the reversal of the segmentation, is continued until a segmentation status corresponding to the number of selection steps is reached.

4. The method as claimed in claim 2, in which the list is subdivided into a number of sub-lists, each of said sub-lists being associated with a different similarity measure value and including the voxels having the same similarity measure value.

5. The method as claimed in claim 2, in which only neighboring voxels of a voxel selected from the list having corresponding similarity measures exceeding a minimum value are included in the list.

6. The method as claimed in claim 2, in which the similarity measure of each voxel is derived from its grey value.

7. An image processing device for performing interactive segmentation of a three-dimensional structure contained in an object from a three-dimensional image of the object, the device comprising:
    at least one memory for storing a three-dimensional image of the object and for storing lists which are processed during the segmentation;
    an image display for displaying a segmented structure; and
    an image processor for segmenting the structure in one of an expansion mode and a contraction mode, wherein during the contraction mode, the image processor removes voxels from the segmented structure based on an instantaneous segmentation status in a segmentation image and during the expansion mode, the image processor:
    a) determines similarities between neighboring voxels of a defined voxel and the structure,
    b) stores an order in which the similarities of the voxels belonging to the structure are determined, and
    c) repeats a) and b) for voxels of the structure which have not yet been processed or have been newly determined.

8. A computer readable medium containing a program, executable by a computer, for segmentation of a three-dimensional structure contained in an object from a three dimensional image of the object, the computer readable medium comprising:
    determining code for determining, in an expansion mode, similarities between neighboring voxels of a defined voxel and the structure;
    storing code for storing, in the expansion mode, an order in which the similarities of the voxels belonging to the structure are determined, wherein execution of the determining code and the storing code is repeated for voxels of the structure which have not yet been processed or have been newly determined; and
    removal code for removing the voxels from the segmented structure, in a contraction mode, based on an instantaneous segmentation status.

9. The image processing device as claimed in claim 7, wherein in the expansion mode, the image processor further: determines a first similarity measure, which describes a similarity between each neighboring voxel and the structure; stores the neighboring voxels in a list; selects a voxel having a largest similarity measure from the list; determines a second similarity measure for neighboring voxels of the selected voxel; and stores the neighboring voxels in the list.

10. The image processing device as claimed in claim 9, wherein the list is subdivided into a plurality of sub-lists, and each sub-list corresponds to a different similarity measure value and includes voxels with a substantially same similarity measure value.

11. The image processing device as claimed in claim 9, wherein only neighboring voxels, of a voxel selected from the list with corresponding similarity measures exceeding a minimum value are included in the list.

12. The image processing device as claimed in claim 9, wherein the similarity measure of each voxel is derived from a corresponding gray scale value.

13. The computer readable medium of claim 8, further including storing the neighboring voxels in a list.

14. The computer readable medium of claim 13, wherein the list is subdivided into a plurality of sub-lists, and each sub-list corresponds to a different similarity measure value and includes voxels with a substantially same similarity measure value.

15. The computer readable medium of claim 13, further including selecting a voxel having a largest similarity measure from the list.

16. The computer readable medium of claim 14, further including determining a second similarity measure for neighboring voxels of the selected voxel.

17. The computer readable medium of claim 16, further including storing the neighboring voxels in the list.

18. The computer readable medium of claim 16, wherein only neighboring voxels, of a voxel selected from the list with corresponding similarity measures exceeding a minimum value are included in the list.

19. The computer readable medium of claim 16, wherein the similarity measure of each voxel is derived from a corresponding gray scale value.

20. A method, comprising: segmenting, with an image processor, a structure contained in an object from a three-dimensional image of the object, including determining similarities between neighboring voxels of a defined voxel and the structure, and storing an order in which the similarities of the voxels belonging to the structure are determined.

\* \* \* \* \*